US006802891B2

United States Patent
Kritzler

(10) Patent No.: US 6,802,891 B2
(45) Date of Patent: Oct. 12, 2004

(54) BIOSTATIC FILTER

(75) Inventor: Steven Kritzler, Cronulla (AU)

(73) Assignee: Novapharm Research (Australia) Pty Ltd, Rosebery (AU)

( * ) Notice: Subject to any disclaimer, the term of this patent is extended or adjusted under 35 U.S.C. 154(b) by 0 days.

(21) Appl. No.: 10/239,714

(22) PCT Filed: Mar. 27, 2001

(86) PCT No.: PCT/AU01/00339
§ 371 (c)(1),
(2), (4) Date: Nov. 4, 2002

(87) PCT Pub. No.: WO01/73356
PCT Pub. Date: Oct. 4, 2001

(65) Prior Publication Data
US 2003/0116022 A1 Jun. 26, 2003

(30) Foreign Application Priority Data
Mar. 29, 2000 (AU) ............................. PQ 6563

(51) Int. Cl.⁷ ...................... B01D 46/10; B01D 29/01
(52) U.S. Cl. ...................... 95/285; 96/227; 55/524; 55/527
(58) Field of Search ............. 95/285; 96/223, 96/226, 227; 55/524, 527, 528

(56) References Cited

U.S. PATENT DOCUMENTS

| 2,638,180 | A | * | 5/1953 | Herkimer ............... 95/285 |
| 3,532,637 | A | * | 10/1970 | Zeff et al. ............... 252/190 |
| 3,947,576 | A | * | 3/1976 | Kuczkowski et al. ....... 514/347 |
| 4,534,775 | A | * | 8/1985 | Frazier .................. 95/92 |
| 5,288,298 | A | | 2/1994 | Aston |
| 5,290,894 | A | * | 3/1994 | Melrose et al. .......... 526/315 |
| 5,370,597 | A | | 12/1994 | Genovese et al. |
| 5,501,238 | A | | 3/1996 | Von Borstel et al. |
| 5,840,245 | A | | 11/1998 | Coombs et al. |
| 5,860,428 | A | | 1/1999 | Lesser et al. |
| 5,872,111 | A | | 2/1999 | Au |
| 6,224,655 | B1 | * | 5/2001 | Messier ................. 96/226 |
| 6,228,382 | B1 | * | 5/2001 | Lindner et al. ........... 424/405 |
| 6,383,273 | B1 | * | 5/2002 | Kepner et al. ........... 106/15.05 |
| 6,543,753 | B1 | * | 4/2003 | Tharp .................. 261/122.2 |
| 6,589,321 | B2 | * | 7/2003 | Kames ................. 96/153 |

FOREIGN PATENT DOCUMENTS

| GB | 846 458 | 8/1960 |
| GB | 2 021 435 | 12/1979 |
| GB | 2 202 042 | 9/1988 |
| GB | 2 320 691 | 7/1998 |
| WO | WO 93/16749 | 9/1993 |
| WO | WO 96/22825 | 8/1996 |

OTHER PUBLICATIONS

Rote Liste Service: "Rote Liste", 1999, Rote Liste Service GMBH, Frankfurt.

* cited by examiner

Primary Examiner—Robert H. Spitzer
(74) Attorney, Agent, or Firm—Nixon & Vanderhye PC

(57) ABSTRACT

Air filters include a composition which has a biostatic or biocidal agent adapted to migrate through particulates accumulating in use on the filter. The biocidal agent may have bacteriostatic and/or fungistatic properties and may optionally include a humectant, a surfactant or rheological additive. Compositions for treating filters and methods of reducing airborne contaminants in the air are also disclosed.

26 Claims, 4 Drawing Sheets

BIOSTATIC FILTER

This application is the US national phase of international application PCT/AU01/00339 filed 27 Mar. 2001 which designated the U.S.

TECHNICAL FIELD

This invention relates to air-conditioning systems and more particularly to a method of, and composition for, reduction in pathogens associated with the filters in such systems. The invention has been developed primarily for use in air-conditioning (including air cooling and air heating) systems, and will be described hereinafter with reference to this field of use. However, it will be appreciated that it is not limited to that particular use

BACKGROUND ART

Air conditioning systems such as are commonly provided in office, residential, health care and other buildings incorporate air filters. An example of such a filter employs non-woven polyester fibres as media to filter airborne particulates in excess of about 10 microns in size from the air, but filters are made from a wide variety of materials, in many different constructions and grades. The function of the filter is to trap dust and particulate contaminants. This trapped matter (the "filtrate") provides a haven for the growth of pathogens such as fungi, bacteria, viruses, allergens, yeasts, and moulds. Conditions for the growth of such organisms are especially favourable during periods of high humidity such as may occur when the system is off, for example at night, but also arise during normal operation. The presence of organisms is highly undesirable because they can cause illness or death in humans and animals, create odours and can damage or destroy a wide variety of materials.

Of particular concern in terms of human health and safety are endotoxins and mycotoxins which are breakdown components of fungal and bacterial cell walls and which are known human respiratory allergens. In some individuals they can trigger asthma attacks, and in all cases have been shown to cause immune response. Over a period of exposure this reduces the ability of the immune system to respond to antagonists and leaves the subject more prone to infection by bacteria, viruses, etc. Also of concern are fungal spores, bacterial spores and bacteria.

The prevention of spore germination and microbial survival in air filtration devices would help reduce the risk of illness and hypersensitivity reactions. It would also increase the useful life of the filtration devices. Microbial activity shortens the life of the filter itself because the increase in biomass on and in the filter can clog pores, lessen air-flow and increase back pressure in the system. In some cases, air filters are prepared from or include natural materials such as cellulose and in that case are rapidly degraded under moist conditions by certain fungi.

It is a major concern in health care facilities such as hospitals and nursing homes that dangerous infectious diseases may be spread by a wide variety of micro-organisms. The problem is exacerbated in such facilities because many of the patients are in a weakened condition due to their primary health care problem. Micro-organisms that would not be a major threat to a healthy person can be fatal to a patient with a diminished capacity to defend themselves from infection.

Increasing attention is also being paid to other environments such as public buildings, since if pathogenic micro-organisms find their way via conditioned air or ventilation shafts, into a building they can be rapidly circulated throughout the building thereby greatly increasing the likelihood of the spread of infection and disease.

One proposed solution to this problem has been to coat filter materials with a biocidal composition. The biocides have been bound onto or into the filter fibres for example by inclusion within polymers prior to extrusion as filter fibres. The present inventor has discovered that such so-called "antimicrobial" filters are biostatically effective when the surface of an unused "antimicrobial" filter material is inoculated with bacteria and/or fungal contaminant in the laboratory, but that the filter becomes progressively ineffective with passage of time in actual use in an air-conditioning system. Consequently the filter should be frequently removed for cleaning and retreatment or replaced. Removal is costly and inconvenient in terms of labour required and downtime, as well as being potentially hazardous, while retreatment or replacement is expensive. Typically the filters are only removed when the airflow resistance becomes unacceptable.

Any discussion of the prior art throughout the specification should in no way be considered as an admission that such prior art is widely known or forms part of the common general knowledge in the field.

It is an object of the present invention to overcome or ameliorate at least one of the deficiencies of the prior art, or to provide a useful alternative.

Many regions of the world employ heated filtered air in buildings as a means of central heating. It will be understood that the furnace and other filters of such systems contribute to the same hazards as described above for air conditioning filters and the invention is not limited to any particular kind of filter or airflow system. It will also be understood that the invention is equally applicable to filters of different kinds and grades, for example to hepafilters.

BRIEF DESCRIPTION OF THE INVENTION

According to a first aspect, the invention provides an air filter including a composition, said composition including a biostatic or biocidal agent wherein the agent is adapted to migrate through particulates accumulating in use on the filter.

For preference, the biostatic or biocidal agent is selected to have bacteriostatic and/or fungistatic properties. The particulates usually accumulate in layers and the biostatic or biocidal agent of the invention migrates through the layer to the outside surface (air/particulate interface) where organic matter would otherwise multiply.

In filters according to the invention the biocide is not bound to the filter surface but is adapted to migrate through the accumulating dust and particulate matter on the filter. Particles in the layer become coated with biocide or biostat.

It will be understood that it is sufficient that the treatment is bacteriostatic or fungistatic. That is to say, it is sufficient that the treating agent stops colonisation on the filter rather than kills organisms in a colonised filter. However biocidal compositions may be used.

According to a second aspect, the invention provides a composition for application to an air filter including:

a water soluble biocidal or biostatic agent, and a humectant whereby the biocidal or biostatic agent is adapted to migrate through a filtrate accumulating, in use, on a surface of the air filter;

It is highly preferred that the composition further includes a surfactant and desirably a fluorosurfactant.

In highly preferred embodiments the composition includes one or more rheological additives for example a thickening agent, a gelling agent, or a viscosity modifier.

According to a third aspect, the invention provides a method of treating a filtrate on a filter including the step of adding to the filter or to the filtrate a biocidal or biostatic agent adapted to migrate through the filtrate According to a fourth aspect, the invention provides a method of reducing airborne contaminants in air including the step of:

treating a filter with an agent according to the second aspect, passing air through the filter whereby to accumulate contaminants as a filtrate on the filter, and allowing the biocide to migrate into the filtrate.

BEST MODES OF PERFORMING THE INVENTION

Figure 1:
FIG. 1 is a photomicrograph (×100) of a new untreated air conditioning dust filter prior to use.
Figure 2:
FIG. 2 is a photomicrograph (×100) showing an untreated filter similar to that of FIG. 1 after 11 months in use in a building air conditioning system.
Figure 3:
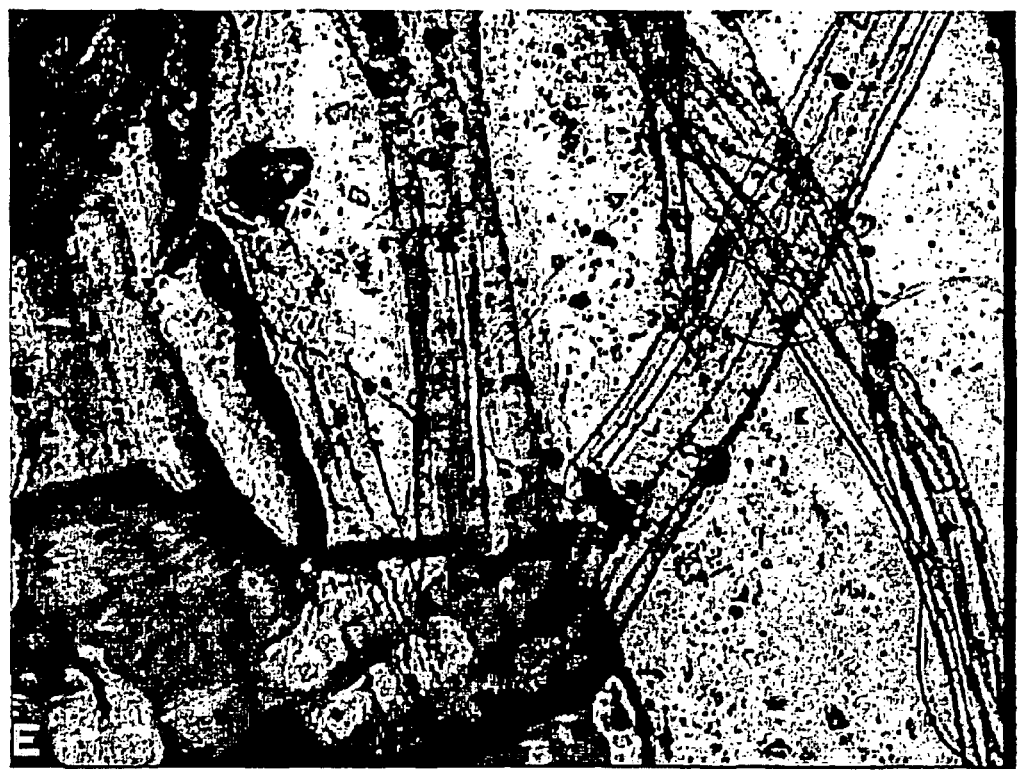
FIG. 3 is a photomicrograph (×100) showing a treated filter similar to that of FIG. 1 after 11 months in use in a building air conditioning system.
Figure 4:
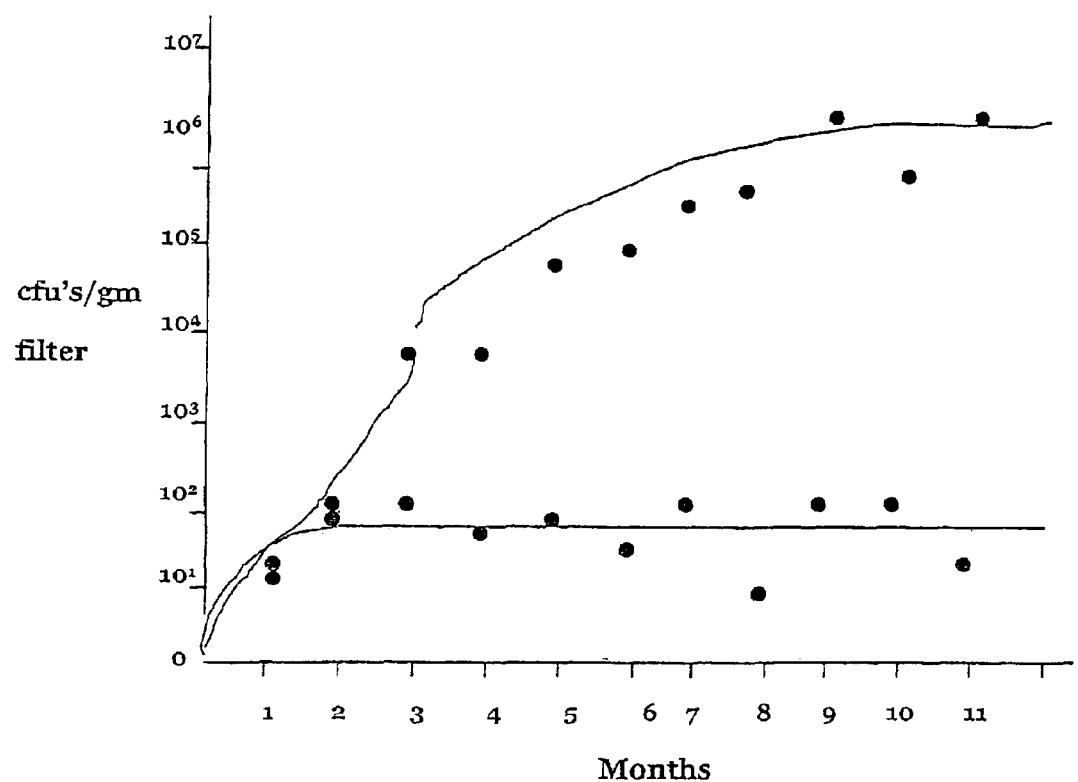
FIG. 4 is a graph comparing the number of colony forming units ("cfu's") per gram of a filter treated in accordance with the invention with an untreated filter as a function of time in use over 11 months

Various embodiments of the invention will now be more particularly described by way of example only and with reference to the figures.

The present inventor has discovered that the application of biocides to filter fibres as in the past is relatively ineffective because; while this treatment can prevent fungal and biocidal activity directly on the filter fibres themselves, as dust accumulate on the filter, the outer surface of the dust becomes removed from the biocide bound to the filter fibres and pathogens then grow on the outside of this dusty residue (that is to say separated from the biocide treated fibres). Thus, as the filter clogs, the biocidal activity reduces. This explains why good results can be obtained in tests applying an innoculum to the prior art filters in the laboratory but without good results being obtained in actual installed continuous use. In contrast, the present invention provides a biocide which remains effective over much longer periods, if not over the useful life of the filter by providing a biocidal preparation adapted to migrate through the layer or layers of accumulating filtrate on the filter towards the surface (air/particulate interface) where the micro-organisms tend to colonise, Surprisingly this can be achieved despite the higher velocity of air at the surface of such residue.

Without wishing to be bound by theory, it is believed that compositions according to the invention are effective because the humectant draws in water which acts as a vehicle for the solution and transport of biostat or biocide (or of a combination of biostats and/or of biocides). In preferred embodiments of the invention the surface tension of the vehicle is effectively lowered by the one or more surface active agents. As the filtrate accumulates on the filter, and the humectant draws in water, the biocidal composition is permitted to migrate to the outermost surface by the aqueous vehicle, maintaining its efficacy against pathogenic organisms, which otherwise would grow on the surface of the particulate layer and in gaps in the particulate residue.

Preferably the biocide wets the exterior surface of individual particles as well as the exterior surface of the particulate layer.

EXAMPLE 1

In a preferred embodiment of the invention, an air filter is coated with a solution containing the dispersion or solution of biocide and humectant in a solvent. In the present example an air conditioning filter according to Australian grade "F5" was treated. The filter was made from a needled non-woven polyester fibre fabric and had a total surface area of about 3.5 square metres. The filter thickness was 10–12 mm and its density was about 280–300 grams per square metre (gsm). A typical fibre diameter would be in the range of 6–15 denier. The filter was treated by spraying with a solution having a formulation as shown in example 2.

EXAMPLE 2

A basic formulation of a treating solution is as follows:

| | |
|---|---|
| Calcium chloride (humectant) | 5–25% |
| Kathon 886MW (biostat) | 0.04% |
| Fluorad FC129 (surfactant) | 0.01% |
| Water qs | 100% |

Note: Kathon 886MW is a preservative obtainable from Rohm & Haas Corp. Fluorad FC 129 is a fluorosurfactant available from 3M corp.

EXAMPLE 3

A preferred formulation for the treating solution is as follows:

| | |
|---|---|
| Calcium chloride (humectant) | 14–18% |
| Kathon 886MW (biostat) | 0.04% |
| Fluorad FC129 (surfactant) | 0.01% |
| Vinyl ether/maleic anhydride copolymer* (viscosity modifier) | 0.8% |
| Water qs | 100% |

*Gantrez available from ISP Corp.

It is desirable to incorporate one or more rheological additives (e.g. viscosity modifiers, gelling agents, thixotropic agents or the like) into the treatment. These control the viscosity of the vehicle to prevent fine droplets of dissolved treating agent from being blown from the filter by the vigorous passage of air, and to assist in retaining the solution on the filter. The type and quantity of rheological additive can be selected having regards to conditions of use.

The preferred treatment is very strongly hydroscopic, taking in moisture from the air passing through the filter and becoming a liquid. This liquids penetration into an accumulating filtrate layer is further enhanced by the incorporation in the treatment of a surface active agent which ensures penetration against the air flow by virtue of low surface tension. The biocides in the formulation are water soluble or partly water soluble and therefore migrate into and through the filtrate layer as part of the treatment.

Other active ingredients may be incorporated into the formulation for permeation through the filtrate, for example fire retardants, airflow promoters or viscosity reducing agents, deodorisers and so forth.

EXAMPLE 4

A filter according to example 1 was treated by spraying with a solution according to example 3 to a level of 230 ml of treating solution per square meter. The treated filter was then dried using dry air. It will be understood that the filter could be coated by dipping or any other convenient method and dried using heat, a vacuum or by any other suitable means or combination of means. The dried filter was then placed into a sealed container, such as a sealed plastic bag, until ready for use.

When the filter was to be used, it was removed from its sealed container, and placed in its operational position in an air-conditioning system. In use, the humectant in a filter prepared in accordance with the invention will begin to absorb water from the environment. This absorption continues through to a stage where a saturated solution of the biocide forms in which the concentration depends on the relative humidity of the air. During the liquefaction process, the biocidal components are partially or completely dissolved in the humectant solution along with the surfactants.

The resulting liquid treatment solution has an extremely low surface tension and high osmolality making it an ideal penetrant. As the filter progressively removes airborne contaminants which accumulate as a filtrate layer, this treatment progressively penetrates and encapsulates the contaminant particles. The encapsulating penetrating treatment which contains an efficacious level of biocide not only kills micro-organisms carried on the airborne contaminant, but also ensures that no microbiological activity takes place in the layer of filtrate itself.

In humid air, the growth of bacteria and pathogens is naturally higher than in dry air. Thus, the present invention provides greater biocidal activity when it is most needed, i.e. during times of high humidity. Reduced biocidal activity may be a consequence of drier air, however it is anticipated that the number and growth of pathogens during such dry conditions would not be so high. These conditions result in an extension of the biocidal life-time of the filter.

The present invention is not directed towards the prevention of clogging of the filter by preventing growth of the biomass, but rather is directed to controlling colonisation by organisms on the filter and in the accumulating residue and ultimately to produce air which is reduced in pathogens.

EXAMPLE 5

Filters treated according to example 4 were placed in service. The treated filters were found to be effective in service for periods of six months or more. At the end of six months, the filter was removed, cleaned, and retreated with fresh composition according to example 1. In conducting these experiments it was noted that spore forming materials if allowed to dry out on the filter tended easily to become airborne and redistributed in the air stream and also tend to be more resistant to biocide when dry. Spore forming materials put a load on the human immune system of those breathing the air. Dead cells, if they become airborne, cause asthma in those susceptible. A further advantage of the present invention is that the humectant maintains a level of moisture at the filtrate surface which reduces spore and cell refluidization.

FIGS. 1–3 are photomicrographs at ×100 magnification showing the effect of treatment after 11 months in use (FIG. 3) compared to untreated filter material before use (FIG. 1) and after 11 months use (FIG. 2). A comparison of the used untreated sample of FIG. 2 with the unused sample of FIG. 1 shows that use results in significant growth of fungal filaments (which appear as fine threads) about the larger diameter filter fibres. Entrapped dirt and dust particles are also visible after use. In contrast, the treated filter of FIG. 3 shows no significant growth of micro-organisms after 11 months exposure although entrapped dirt and dust particles are naturally clearly visible.

EXAMPLE 6

A series of identical new filters were taken and 20% of them were treated as in example 4 with the composition of example 3. The remaining 80% of the series were left untreated. The treated and untreated filters were put into the same air handling system, such that the treated filters were alternated with untreated filters. On a monthly basis samples were taken from both a treated and an adjacent untreated filter and the number of viable fungal and bacterial species were counted. The results (expressed as colony forming units "cfu's/gram of filter) are shown in FIG. 4 as a function of time in months. The rate of colonization of the treated filter was not significantly different from that of the untreated filter during the first month. However, thereafter the cfu's gram climbed to in excess of Log 6 organisms per gram of clean filter material, whilst the corresponding figure for the treated filter substantially stabilized within two months at about Log 2 cfu's/gram of clean filter material—a dramatically improved result.

Suitable biocides for use in the invention include, but are not limited to, 2-bromo-2-nitropropane-1,3-diol (Bronopol); Isothiazolines such as methyl, or chloromethyl isothiazolinone (Kathon 886 MW); Methyl or propyl or butyl parahydroxybenzoates; sorbic acid, benzoic acid and salts of these acids, phenoxy ethanol; triclosan; diclosan; dichlorophen; chlorhexidine gluconate, orthophenylphenol; benzalkonium halides; and other quaternary biocides orthobenzylparachlorophenol, substituted diphenyl ethers.

A preferred humectant for use in the invention is calcium chloride. Examples of other humectants are glycerol, sorbitol, ethylene glycol, PEG, propylene glycol, 1,3 butylene glycol, PCA (2-Pyrrolidone-5-carboxylic acid), sodium sulphate, sodium hydroxide, lactic acid and derivatives, sodium chloride and the like. Those skilled in the art will have no difficulty in selecting suitable humectants having regard to the construction materials in the system and the composition of the filter based on the disclosure herein contained. Some humectants also act as surfactants. One example is sodium dioctylsulphosuccinate.

A preferred surfactant class for use in the invention is fluoro surfactants, such as Fluorad FC129. These are preferred because they have a profound ability to reduce surface tension. However other surfactants can be employed. By way of example only, the surfactant may be non-ionic (e.g. ethoxylates, propoxylates and block co-polymers of these two), anionic surfactants (such as sodium dodecylbenzenesulphonate, sodium dioctylsulphosuccinate, sodium salts of sulphonated or sulphated organic ethoxylates or propoxylates), cationic surfactants (such as Cetrimonium Chloride or such as secondary, tertiary and quaternary organoamines) or even amphoteric surfactants (such Cocamidopropylene Betaine).

Examples of rheological agents which may be included are sodium carboxymethylcellulose; hydroxyethylcellulose; hydroxypropylcellulose; polyethylene glycols; polypropylene glycols; polyvinyl alcohol; polyvinyl acetate, polyvinylpyrrolidone and copolymers of these, hydroxypropyl guar, xanthan gum, chitosan, acrylated copolymers, polyacrylic polymers (carbopols) and the like. However many other water soluble polymers would be similarly advantageous.

Although the composition in the examples was applied to the filter from an aqueous solution or suspension, it may be possible and advantageous to apply the humectant and biostat to the filter as a solid or from a non aqueous solvent and such compositions are within the scope of the invention.

It will be understood that compositions according to the invention can be applied to filters of any material. Tests have been conducted with filters of polypropylene, viscose, rayon, cellulosics, and glass fibre. However the principle of operation herein described is adaptable to filters of other materials and of other construction (such as for example woven, non-woven, spunbond, meltblown, laminates and the like).

It will be understood that the treating agent may employ one or more biocides and may be formulated based on the principles herein taught in a variety of formulations. Although it is preferred to pre-treat filters, a filter may be treated in situ by admitting a composition according to the invention as a spray downstream of the filter or by direct application (continuously or intermittently) of a biostat onto the filtrate layer of a filter in service, or prior to removal. The treatment may also be reapplied to a filter removed from service, with or without removal of filtrate.

Although the invention has been described with reference to specific examples, it will be appreciated by those skilled in the art that the invention may be embodied in other forms.

What is claimed is:

1. A method of reducing airborne contaminants in air including the steps of:

treating a filter with a composition which comprises a water soluble biocidal or biostatic agent, and a suitable humectant, passing air through the filter whereby to accumulate contaminants as a filtrate on a surface of the filter; and allowing the biocide to migrate into the filtrate such that the composition remains effective, in service, for periods of 6 months or more.

2. A method of reducing airborne contaminants in air including the steps of:

treating a filter with a composition comprised of a biocidal or biostatic agent and a suitable humectant;

passing air through the filter whereby to accumulate contaminants as a filtrate on the filter; and allowing the biocide to migrate throughout the filtrate.

3. The method according to claim 1 or 2, wherein the composition further comprises a surfactant.

4. The method according to claim 3, wherein the composition further comprises one or more rheological additives.

5. The method according to claim 4, wherein the rheological additive is a thickening agent, a gelling agent or a viscosity modifier.

6. The method according to claim 1 or 2, wherein the composition further comprises a fluorosurfactant.

7. The method according to claim 1 or 2, wherein the biocidal or biostatic agent is selected from 2-bromo-2-nitropropane-1,3-diol, isothiazolines, methyl or propyl or butyl parahydroxybenzoates; sorbic acid, benzoic acid and salts of these acids, phenoxy ethanol; triclosan; diclosan; dichlorophen; chlorhexidine gluconate, orthophenylphenol; quaternary biocides, orthobenzylparachlorophenol, and substituted diphenyl ethers.

8. The method according to claim 1 or 2, wherein the agent is 2-bromo-2-nitropropane-1,3-diol.

9. The method according to claim 1 or 2, wherein the humectant is selected from calcium chloride, glycerol, sorbitol, ethylene glycol, PEG, propylene glycol, 1,3 butylene glycol, sodium sulphate, sodium chloride and sodium dioctylsulphosuccinate.

10. The method according to claim 1 or 2, wherein the humectant is calcium chloride.

11. The method according to claim 1 or 2, wherein the composition further comprises a vinyl ether/maleic anhydride copolymer as a rheological additive.

12. An air filter treated with a composition, said composition including a biostatic or biocidal agent wherein the agent is adapted to migrate through particulates accumulating in use on the filter, and which after 3 months in normal use produces at least log 1 reduction in cfu's/gram of clean filter material in comparison with an untreated filter under the same conditions.

13. An air filter according to claim 12 wherein the biostatic or biocidal agent is selected to have bacteriostatic and/or fungistatic properties.

14. A composition for application to an air filter, said composition including:

a water soluble biocidal or biostatic agent, and a suitable humectant, whereby the biocidal or biostatic agent is adapted to migrate through a filtrate accumulating, in use, on a surface of the air filter, and wherein the composition remains effective, in service, for periods of 6 months or more.

15. A composition according to claim 14 further including a surfactant.

16. A composition according to claim 15 further including one or more rheological additives.

17. A composition according to claim 16 wherein the rheological additive is a thickening agent, a gelling agent or a viscosity modifier.

18. A composition according to claim 16 wherein the rheological additive is one or more compound selected from sodium carboxymethylcellulose; hydroxyethylcellulose; hydroxypropylcellulose; polyethylene glycols; polypropylene glycols; polyvinyl alcohol; polyvinyl acetate, polyvinylpyrrolidone and copolymers of these, hydroxypropyl guar, xanthan gum, chitosan, acrylated copolymers, polyacrylic polymers (carbopols) and water soluble polymers.

19. A composition according to claim 16 wherein the rheological additive is vinyl ether/maleic anhydride copolymer.

20. A composition according to claim 14, further including a fluorosurfactant.

21. A composition according to claim 14 wherein the biocidal or biostatic agent is selected from 2-bromo-2-nitropropane-1,3-diol, isothiazolines, methyl or propyl or butyl parahydroxybenzoates; sorbic acid, benzoic acid and salts of these acids, phenoxy ethanol; triclosan; diclosan; dichlorophen; chlorhexidine gluconate, orthophenylphenol; quaternary biocides, orthobenzylparachlorophenol, and substituted diphenyl ethers.

22. A composition according to claim 14 wherein the agent is 2-bromo-2-nitropropane-1,3-diol.

23. A composition according to claim 14 wherein the humectant is selected from calcium chloride, glycerol, sorbitol, ethylene glycol, PEG, propylene glycol, 1,3 butylene glycol, sodium sulphate, sodium chloride and sodium dioctylsulphosuccinate.

24. A composition according to claim 14 wherein the humectant is calcium chloride.

25. A filter when treated with a composition according to any one of claims 14–19.

26. A method of treating a filtrate on a filter including the step of adding to the filter or to the filtrate a biocidal or biostatic agent adapted by means of a suitable humectant to migrate through the filter.

* * * * *